(12) United States Patent
Liu et al.

(10) Patent No.: US 12,745,259 B2
(45) Date of Patent: Sep. 22, 2026

(54) CHANNEL TRANSMISSION BEHAVIOR DETERMINING METHOD AND APPARATUS AND TERMINAL

(71) Applicant: VIVO MOBILE COMMUNICATION CO., LTD., Dongguan (CN)

(72) Inventors: Hao Liu, Dongguan (CN); Kai Wu, Dongguan (CN); Rakesh Tamrakar, Dongguan (CN); Zichao Ji, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 461 days.

(21) Appl. No.: 18/244,894

(22) Filed: Sep. 11, 2023

(65) Prior Publication Data

US 2023/0422269 A1 Dec. 28, 2023

Related U.S. Application Data

(63) Continuation of application No. PCT/CN2022/080144, filed on Mar. 10, 2022.

(30) Foreign Application Priority Data

Mar. 11, 2021 (CN) ......................... 202110266058.0

(51) Int. Cl.
*H04W 72/232* (2023.01)
*H04L 1/00* (2006.01)
*H04L 1/08* (2006.01)

(52) U.S. Cl.
CPC ......... *H04W 72/232* (2023.01); *H04L 1/0061* (2013.01); *H04L 1/08* (2013.01)

(58) Field of Classification Search
CPC ... H04L 1/0038; H04L 1/0041; H04L 1/0061; H04L 1/0072; H04L 1/08; H04L 1/189; H04L 1/1896; H04L 5/0053; H04W 72/232; H04W 24/02; H04W 24/08
See application file for complete search history.

(56) References Cited

U.S. PATENT DOCUMENTS

2019/0141679 A1 5/2019 He et al.
2019/0182807 A1 6/2019 Panteleev et al.
2019/0222400 A1 7/2019 Bagheri et al.
2022/0038210 A1* 2/2022 Liu .......................... H04L 1/08

FOREIGN PATENT DOCUMENTS

CN 104811409 A 7/2015
CN 106455095 A 2/2017
CN 110603765 A 12/2019

(Continued)

OTHER PUBLICATIONS

International Search Report issued in corresponding International Application No. PCT/CN2022/080144, mailed Jun. 1, 2022, 4 pages.

(Continued)

*Primary Examiner* — Eron J Sorrell
(74) *Attorney, Agent, or Firm* — IPX PLLC

(57) ABSTRACT

A method for determining channel transmission behavior includes: receiving a physical downlink control channel (PDCCH); and determining that the PDCCH is non-repetition transmission or repetition transmission.

20 Claims, 4 Drawing Sheets

(56) References Cited

FOREIGN PATENT DOCUMENTS

| | | | | | |
|---|---|---|---|---|---|
| EP | 3843309 | A1 | 6/2021 | | |
| WO | 20200045935 | A1 | 3/2020 | | |
| WO | WO-2022031892 | A1 * | 2/2022 | ........... | H04L 1/0038 |
| WO | WO-2022080501 | A1 * | 4/2022 | ........... | H04L 5/0053 |

OTHER PUBLICATIONS

Interdigital Inc., "Evaluation of PDCCH repetition for URLLC", 3GPP TSG RAN WG1 Meeting #92bis R1-1804853, Apr. 2018, 7 pages.
Extended European Search Report issued in related European Application No. 22766359.8, mailed Aug. 21, 2024, 10 pages.
Moderator (Qualcomm) : "Discussion Summaryll,6,7, for mTRP PDCCH Reliability Enhancements", 113-15 3GPP Draft; R1-2101838, Jan. 2021, 49 pages.

* cited by examiner

CHANNEL TRANSMISSION BEHAVIOR DETERMINING METHOD AND APPARATUS AND TERMINAL

CROSS-REFERENCE TO RELATED APPLICATIONS

This application is a continuation of International Application No. PCT/CN2022/080144, filed Mar. 10, 2022, which claims priority to Chinese Patent Application No. 202110266058.0, filed Mar. 11, 2021. The entire contents of each of the above-referenced applications are expressly incorporated herein by reference.

TECHNICAL FIELD

The present application relates to the technical field of wireless communication, and in particular relates to a method for determining channel transmission behavior and apparatus and a terminal.

BACKGROUND

In related technologies, a base station may perform dynamic switching on one or more Transmitting Receiving Point (TRP) to transmit a Physical downlink control channel (PDCCH). Considering the flexible configuration of base station, the PDCCH monitoring occasions for single TRP transmission and multi-TRP transmission may overlap in time-frequency resources, resulting in that a terminal is unable to accurately determine, based on a detected PDCCH, how to perform subsequent actions.

SUMMARY

Embodiments of the present application provide a method for determining channel transmission behavior and apparatus and a terminal.

According to a first aspect, a method for determining channel transmission behavior is provided, executed by a terminal. The method includes: receiving a physical downlink control channel PDCCH; and determining that the PDCCH is non-repetition transmission or repetition transmission.

According to a second aspect, an apparatus for determining channel transmission behavior is provided, including: a receiving module, configured to receive a physical downlink control channel (PDCCH); and a determining module, configured to determine whether the PDCCH is non-transmission or repetition transmission.

According to a third aspect, a terminal is provided, where the terminal includes a processor, a memory, and a program or an instruction stored in the memory and executable on the processor, where when the program or instruction is executed by the processor, steps of the method according to the first aspect are implemented.

According to a fourth aspect, a readable storage medium is provided. The readable storage medium stores a program or an instruction, and the program or the instruction is executed by a processor to implement the steps of the method according to the first aspect.

According to a fifth aspect, a chip is provided, where the chip includes a processor and a communication interface, the communication interface is coupled to the processor, and the processor is configured to run a program or an instruction to implement the method according to the first aspect.

A sixth aspect provides a computer program product. The computer program product includes a processor, a memory, and a program or an instruction stored in the memory and executable on the processor, where when the program or the instruction is executed by the processor, the steps of the method according to the first aspect are implemented.

In the embodiment of the present application, by determining that the PDCCH is non-repetition transmission or repetition transmission during the receiving process of the PDCCH, the terminal can know that the received PDCCH is non-repetition transmission or repetition transmission, and then can clearly determine how to perform subsequent behaviors.

DETAILED DESCRIPTION

The following clearly describes the technical solutions in embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms “first”, “second”, and the like in the description and the claims of this application are used to distinguish between similar objects, and do not need to be used to describe a specific order or sequence. It should be understood that, the terms used in such a way is interchangeable in proper circumstances, so that the embodiments of this application can be implemented in an order other than the order illustrated or described herein. Objects classified by “first” and “second” are usually of a same type, and the number of objects is not limited. For example, there may be one or more first objects. In addition, in the description and the claims, “and/or” represents at least one of connected objects, and a character “/” generally represents an “or” relationship between associated objects.

It should be noted that, the technologies described in the embodiments of this application are not limited to a Long Term Evolution (LTE)/LTE-Advanced (LTE-A) system, and can also be used in other wireless communication systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. However, the following descriptions describe a New Radio (NR) system for example purposes, and NR terms are used in most of the following descriptions, although these technologies can also be applied to an application other than an NR system application, for example, a 6th generation (6G) communications system.

Figure 1:
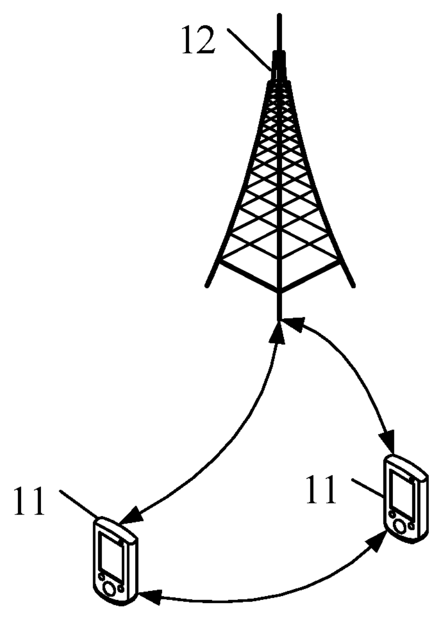
FIG. 1 is a schematic structural diagram of a wireless communication system provided by an exemplary embodiment of the present application.

FIG. 1 is a schematic structural diagram of a wireless communication system to which this embodiment of the present application is applicable. The wireless communications system includes a terminal 11 and a network side device 12. The terminal 11 may be referred to as a terminal device or User Equipment (UE). The terminal 11 may be a mobile phone, a tablet personal computer, a laptop computer or a notebook computer, a Personal Digital Assistant (PDA), a palmtop computer, a netbook, an ultra-mobile personal computer (UMPC), a mobile Internet device (MID), a wearable device, vehicle user equipment, and pedestrian user equipment (PUE). The wearable device includes a bracelet, a headset, and glasses. It should be noted that a specific type of the terminal 11 is not limited in this embodiment of this application. The network side device 12 may be a base station or a core network. The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a WLAN access point, a Wi-Fi node, a Transmitting Receiving Point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

With reference to the accompanying drawings, the technical solutions provided in the embodiments of this application are described in detail by using embodiments and application scenarios.

Figure 2:
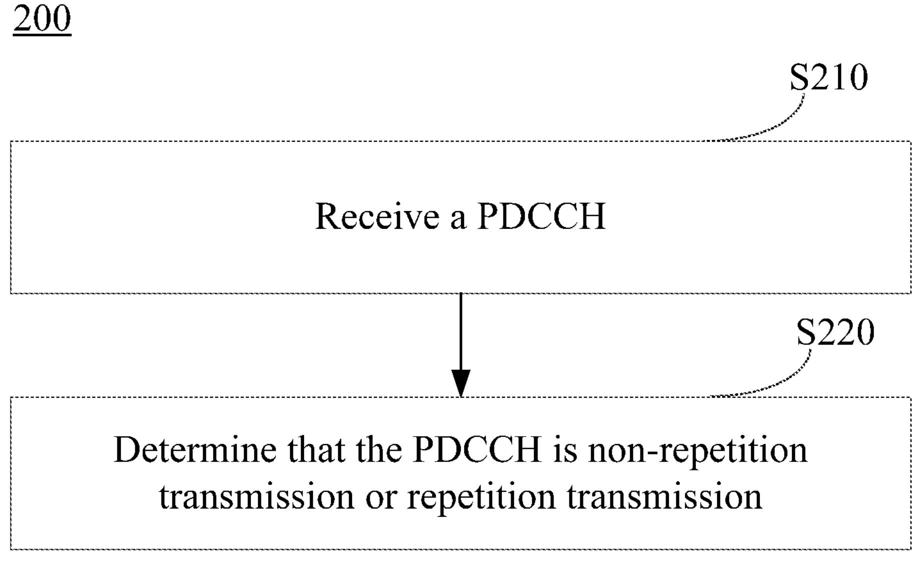
FIG. 2 is a schematic flowchart of a method for determining channel transmission behavior provided by an exemplary embodiment of the present application.

As shown in FIG. 2, it is a schematic flowchart of a method for determining channel transmission behavior 200 provided by an exemplary embodiment of the present application. The method 200 can be executed by a terminal, for example, by software or/and hardware installed in the terminal. The method 200 may at least include the following steps.

S210. Receive a PDCCH.

It can be understood that the terminal receiving the PDCCH can also be understood as: the terminal detects or blindly detects the PDCCH.

S220. Determine that the PDCCH is non-repetition transmission or repetition transmission.

The channel transmission behavior includes non-repetition transmission (that is, single transmission) and/or repetition transmission. In this embodiment, the repetition transmission may have the same time-frequency resources, or may have different time-frequency resources. For example, the repetition transmission occasion corresponding to the repetition transmission of the PDCCH may be implemented based on a Single Frequency Network (SFN), or may be implemented in a time-division and completely orthogonal manner or in a frequency-division and completely orthogonal manner based on different monitoring occasions, or may be implemented in a time-division manner with overlapping of some resources or in a frequency-division manner with overlapping of some resources based on different monitoring occasions.

In addition, in an implementation, the repetition transmission described in this embodiment may be implemented through Multi-TRP (M-TRP) or Single-TRP (S-TRP) transmission.

On the basis of the foregoing content, it is assumed that at a certain monitoring occasion or slot, time-frequency resources of the PDCCH candidate for a single transmission and the PDCCH candidate for repetition transmission completely overlap, or frequency domain resources of the PDCCH candidates for a single transmission and the PDCCH candidate for repetition transmission partially overlap and the start index of Control Channel Element (CCE) of the two similar PDCCH candidates are same, and the associated control resource sets (CORESETs) are all configured with 1 OFDM symbol and non-interleaving is configured. In this case, the terminal cannot determine whether the successfully received (or detected) PDCCH or DCI format belongs to non-repetition transmission or repetition transmission. In this regard, in this embodiment, by determining the channel transmission behavior corresponding to the PDCCH during the receiving process of the PDCCH, the terminal may determine whether the PDCCH comes from a single TRP or multiple TRPs, that is, the terminal determines whether the PDCCH belongs to repetition transmission or non-repetition transmission. Thus, on the one hand, the terminal can clearly know the channel transmission behavior of the received PDCCH, and then clearly determine how to execute the subsequent behavior, such as executing the first protocol version or the second protocol version (the second protocol version can be an enhanced version of the first protocol version, or the second protocol version can be a version after the first protocol version, such as the first protocol version can be Rel16 and the second protocol version can be Rel17), ensuring communication quality. On the other hand, on the basis of the technical solution given in this application, it can also ensure that the base station can dynamically send a PDCCH on a single TRP and multiple TRPs, ensuring the flexibility of base station configuration.

Figure 3:
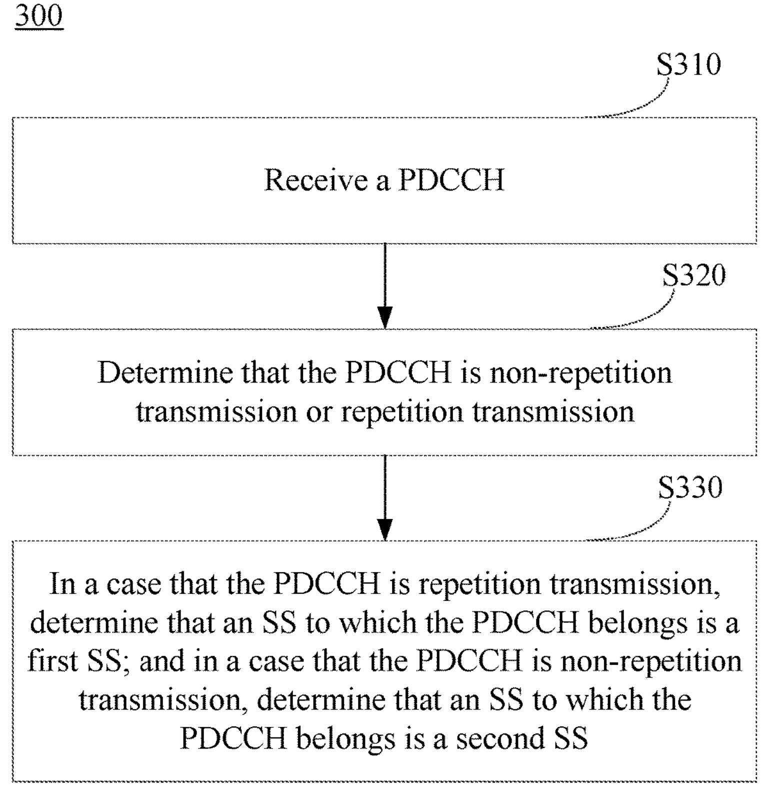
FIG. 3 is a schematic flowchart of a method for determining channel transmission behavior provided by another exemplary embodiment of the present application.

As shown in FIG. 3, it is a schematic flowchart of a method for determining channel transmission behavior 300 provided by an exemplary embodiment of the present application. The method 300 can be executed by a terminal, for example, by software or/and hardware installed in the terminal. The method 300 may at least include the following steps.

S310. Receive a PDCCH.

S320. Determine that the PDCCH is non-repetition transmission or repetition transmission.

It should be noted that, in addition to referring to the relevant descriptions in the aforementioned S210 and S220 for the implementation process of S310 and S320, this embodiment also provides several possible implementations about the "determining that the PDCCH is non-repetition transmission or repetition transmission" described in S320, which are introduced below.

First Implementation

During the receiving process of the PDCCH, the process for the terminal to determine that the PDCCH is non-repetition transmission or repetition transmission may include: determining that the PDCCH is non-repetition transmission or repetition transmission according to a scrambling mode of the PDCCH.

It can be understood that the final successful decoding of the PDCCH is based on cyclic redundancy check (CRC), and a CRC check bit of the PDCCH needs to be implemented based on a corresponding CRC scrambling identifier (such as a Radio Network Temporary Identifier (RNTI)). At present, the total number of CRC bits of the PDCCH is 24 bits, of which 16 bits are used for RNTI scrambling with the purpose for the terminal to identify different Downlink Control Information format (DCI format). In the remaining 8 bits, N1 (N1=2) bits are used for decoding the polar of the PDCCH, and N2=8−N1 bits can be scrambled by introducing a certain scrambling code value. When PDCCH is S-TRP transmission, the scrambling code value is not used for scrambling. During the CRC check, the terminal comprehensively considers the RNTI and the scrambling code value to perform CRC check.

On this premise, in this embodiment, different scrambling methods are used for determining the channel transmission behavior corresponding to the PDCCH. Exemplarily, the scrambling method may include any one of the following (1) to (3).

(1) Scramble at least one of the CRC bits by using a first identifier, where the first identifier is a unique identifier for scrambling a channel for repetition transmission.

That is, the first identifier is a newly introduced identifier, which is dedicated to identifying channels for repetition transmission. For example, in this embodiment, the first identifier can be used to scramble any 6 bits in the CRC bits (24 bits), the first identifier can also be used to scramble the middle 16 bits of the CRC bits, or the first identifier can be used to scramble the 16 bits at bit positions scrambled by using the legacy RNTI (that is, the last 16 bits of the CRC bits), which is not limited in this embodiment. It should be understood that, the number of bits of the first identifier matches the number of bits at the scrambled positions, for example, when the first identifier is 10 bits, the number of bits at the scrambled positions is also 10 bits.

In some embodiments, the first identifier may be configured through high-layer signaling, may also be defined by a protocol, or may be determined based on a fourth identifier, and the like.

When the first identifier is configured through high-level signaling, the process may include: after the terminal obtains the C-RNTI through a Random Access Channel (RACH), the network side may use high-level signaling (for example, RRC or MAC CE) to notify the terminal that a new RNTI (that is, the first identifier) is used for repetition transmission of the PDCCH.

In addition, when the first identifier is determined based on the fourth identifier, the fourth identifier may be an legacy RNTI, such as an SI-RNTI for parsing system messages, a P-RNTI for parsing paging channels, and a C-RNTI for a service of the terminal identified by the terminal, a RA-RNTI for random access, a TPC-RNTI for power control commands, etc. It should be noted that although the fourth identifier has 16 bits, the first identifier determined based on the fourth identifier may be but not limited to 16 bits.

Exemplarily, when the first identifier is determined based on the third identifier, it is assumed that the third identifier is a C-RNTI, an offset formula is introduced, and the offset may be a fixed value. Then, the first identifier may be mod(C-RNTI+offset, 65536), where mod represents a modulo operation.

In some embodiments, when the first identifier is determined based on the third identifier, assuming that the third identifier is a C-RNTI, the first identifier can be obtained by flipping the hexadecimal bit representation of the C-RNTI, for example, the first identifier is equal to 65535-C-RNTI.

In addition, the first identifier may be associated with a first Search Space (SS) for repetition transmission.

(2) Scramble at least one bit in a first bit group by using the second identifier, the first bit group is other bits in the CRC bits except a second bit group, the second bit group are bits used by the terminal to determine different DCI formats, the second identifier is a unique identifier used to scramble the channel for repetition transmission, and the number of bits in the second identifier is not greater than the number of bits in the first bit group.

Referring to the description of the aforementioned (1), the second bit group refers to the last 16 bits of the aforementioned 24 CRC bits, and the first bit group may be the remaining 8 bits in the 24 bits except the last 16 bits. It can be understood that the number of bits in the second identifier is not greater than 8, so as to ensure that the number of bits in the second identifier matches the number of bits (such as 6 bits or 5 bits) at the scrambling positions.

Similar to the first identifier, the second identifier may be determined through any one of high-layer signaling configuration, protocol agreement, etc., or the second identifier may also be associated with the first SS for repetition transmission.

(3) Scramble a third bit group by using a third identifier, where the third bit group is obtained by shifting the second bit group.

For example, if the second bit group is the last 16 bits in the CRC bits, the third bit group can be obtained by shifting the second bit group to the left by 3 bits, that is, the third bit group can be the sixth bit to the 21st bit of the CRC bits; or the third bit group can be obtained by shifting the second bit group to the left by 4 bits, that is, the third bit group is the 5th to 20th bits of the CRC bits.

The third identifier may be an existing identifier, such as SI-RNTI, P-RNTI, C-RNTI, RA-RNTI, or TPC-RNTI.

It should be noted that the scrambling manner described in this implementation may at least include at least one of the foregoing (1) to (3), which is not limited in this embodiment.

Second Implementation

During the receiving process of the PDCCH, the process for the terminal to determine that the PDCCH is non-repetition transmission or repetition transmission may include: determining that the PDCCH is non-repetition transmission or repetition transmission according to predetermined information carried in the PDCCH. The predetermined information is used to indicate that the PDCCH belongs to repetition transmission or non-repetition transmission.

Exemplarily, 1 bit information may be introduced in the PDCCH payload as the predetermined information to indicate that the PDCCH belongs to repetition transmission or non-repetition transmission, for example, when the predetermined information is “0”, the PDCCH belongs to repetition transmission, when the predetermined information is “1”, the PDCCH belongs to non-repetition transmission; or when the predetermined information is “1”, the PDCCH belongs to repetition transmission, and when the predetermined information is “0”, the PDCCH belongs to non-repetition transmission.

In addition, the DCI corresponding to the PDCCH can also be used to indicate, for example, one field information in the DCI or one bit information in field information is used as predetermined information to indicate that the PDCCH belongs to repetition transmission or non-repetition transmission.

It can be understood that the location of the predetermined information on the PDCCH and specific content of the predetermined information may be configured by the network side or defined by a protocol, and are not limited here.

Third Implementation

During the receiving process of the PDCCH, the process for the terminal to determine that the PDCCH is non-repetition transmission or repetition transmission may include: defaulting that the PDCCH is a designated channel transmission behavior, where the designated channel transmission behavior is repetition transmission or non-repetition transmission.

Exemplarily, any PDCCH candidate belongs to a candidate in the SS used for S-TRP transmission, and also belongs to a candidate in the search spaces used for M-TRP transmission. When receiving, the terminal can always assume (that is, default) that the PDCCH candidate only is a PDCCH candidate in the search space used for M-TRP (or S-TRP) transmission, or always assume (that is, default) that the PDCCH candidate only is a PDCCH candidate in the search space used for S-TRP transmission.

Fourth Implementation

During the reception process of the PDCCH, the process of determining whether the PDCCH is non-repetition transmission or repetition transmission by the terminal can include: determining that the PDCCH is non-repetition transmission or repetition transmission according to a specified identifier on a monitoring occasion corresponding to the PDCCH, where the monitoring occasion is a monitoring occasion used to monitor the PDCCH, and the specified identifier includes an SS identifier or a control resource set identifier.

The determining, by the terminal, that the PDCCH is non-repetition transmission or repetition transmission according to a designated identifier on a monitoring occasion includes: determining that the PDCCH is non-repetition transmission or repetition transmission according to the largest or smallest identifier of designated identifiers.

Exemplarily, it is assumed that search space ID1 (SS1) and search space ID2 (SS2) are used for repetition transmission of the PDCCH of Multi-TRP, and searchspace ID3 (SS3) is used for non-repetition transmission of the PDCCH of Single-TRP.

In this case, if time-frequency resources of the PDCCH candidates for Single-TRP and the PDCCH candidates for Multi-TRP overlap on a certain monitoring occasion in the current slot (represented by an oblique padding block in FIG. 4), the terminal always determines whether the PDCCH is repetition transmission according to the smallest searchspace ID, for example, if searchspace ID2<searchspace ID3, the terminal considers the PDCCH to be repetition transmission.

In some embodimnets, the terminal always determines whether the PDCCH is repetition transmission or non-repetition transmission according to the largest searchspace ID, for example, if searchspace ID3>searchspace ID2, the terminal considers the PDCCH to be repetition transmission.

Fifth Implementation

During the receiving process of the PDCCH, the process of determining, by the terminal, that the PDCCH is non-repetition transmission or repetition transmission process may include: in a case that the PDCCH is successfully received based on a first aggregation level (AL), determining that the PDCCH is repetition transmission; and in a case that the PDCCH is successfully received based on a second aggregation level, determining that the PDCCH is non-repetition transmission; where the first aggregation level and the second aggregation level are different. The first aggregation level and the second aggregation level are pre-configured by the network side or defined by the protocol, and are used for determining channel transmission behaviors.

In a possible implementation, in a case that a first aggregation level group and a second aggregation level group are preconfigured, and the first aggregation level group and the second aggregation level group respectively include one or more aggregation levels (for example, that the first aggregation level group or the second aggregation level group includes one or more different aggregation levels is preconfigured for each SS via RRC), the first aggregation level is the largest aggregation level in the first aggregation level group, and the second aggregation level is the smallest aggregation level in the second aggregation level group; or the first aggregation level is the smallest aggregation level in the first aggregation level group, and the second aggregation level is the largest aggregation level in the second aggregation level group.

It should be noted that when the first aggregation level is 16, the second aggregation level cannot be 8; or when the second aggregation level is 16, the first aggregation level cannot be 8. For example, in a case that a first condition is satisfied, the first aggregation level is 16, and the second aggregation level cannot be 8, or the first aggregation level is 8, and the second aggregation level cannot be 16; and the first condition includes: start indexes of control channel elements (CCE) of the two PDCCH candidates are the same, associated control resource sets are configured with one OFDM symbol, the control resource sets are in non-interleaving mode; one of the two PDCCH candidates is used for receiving the PDCCH of non-repetition transmission, and the other is used for receiving the PDCCH of repetition transmission.

Exemplarily, assuming that the second aggregation level group AL={8,16} is configured for the search space corresponding to the PDCCH non-repetition transmission of Single-TRP, that means the terminal normally needs to receive the PDCCH non-repetition transmission in PDCCH candidates with aggregation levels 8 and 16.

Assuming that the first aggregation level group AL={4,8} is configured for the search spaces corresponding to the PDCCH repetition transmission of Multi-TRP, that means that the terminal normally needs to receive in PDCCH candidates under aggregation levels 4 and 8.

If the time-frequency resources of PDCCH candidates on a certain monitoring occasion in the current slot for Single-TRP and PDCCH candidates on the monitoring occasion in the current slot for Multi-TRP overlap, the terminal considers that the base station only sends the PDCCH of Single TRP on a candidate with the maximum aggregation level 16 in the second aggregation level group, and only sends the PDCCH of Multi-TRP on a candidate with the minimum aggregation level 4 in the first aggregation level group. That is, if the terminal successfully receives the PDCCH based on the maximum aggregation level 16, it can be determined that the PDCCH is non-repetition transmission, and if the terminal successfully receives the PDCCH based on the minimum aggregation level 4, it can be determined that the PDCCH is repetition transmission.

In addition, as a possible implementation, the step of the terminal determining that the PDCCH is non-repetition transmission or repetition transmission may further include:

in a case that the PDCCH is successfully received based on a third aggregation level and the first condition is satisfied, determining that the PDCCH is repetition transmission or non-repetition transmission according to a search space associated with the fourth aggregation level; where the third aggregation level is 8, and the fourth aggregation level is 16; and the first condition includes: start indexes of control channel elements of the two PDCCH candidates are the same, associated control resource sets are configured with one OFDM symbol, the control resource sets are in non-interleaving mode; one of the two PDCCH candidates is used for receiving the PDCCH of non-repetition transmission, and the other is used for receiving the PDCCH of repetition transmission.

S330. In a case that the PDCCH is repetition transmission, determine that an SS to which the PDCCH belongs is a first SS; and in a case that the PDCCH is non-repetition transmission, determine that an SS to which the PDCCH belongs is a second SS; where the first SS is used for repetition transmission, and the second SS is used for non-repetition transmission.

In this embodiment, the SS used to receive the PDCCH may include a first SS and a second SS, the first SS is used for repetition transmission, and the second SS is used for non-repetition transmission, thereby enabling the terminal to determine, based on the PDCCH channel transmission behavior (such as repetition transmission or non-repetition transmission), the search space to which the PDCCH received by the terminal belongs (from), so as to clearly determine how to perform subsequent actions, such as executing Rel16 or Rel17.

It can be understood that the SS is used to indicate, to the terminal, monitoring occasions in time domain and PDCCH candidates on the corresponding monitoring occasions for monitor the PDCCH. In this embodiment, the network side may configure the first SS to be used for repetition transmission, and the second SS to be used for non-repetition transmission, etc.

Based on the foregoing embodiments, in the receiving process of the PDCCH, the terminal can determine the channel transmission behavior of the PDCCH based on different implementations, and further determine, based on the channel transmission behavior of the PDCCH, the search space to which the PDCCH belongs (from), so that the terminal can clearly know the channel transmission behavior of the received PDCCH, and then clearly determine how to execute subsequent behaviors to ensure communication quality.

It should be noted that, in the method for determining channel transmission behaviors 200 or 300 provided by the embodiment of the present application, the execution subject may be the apparatus for determining channel transmission behavior, or a control module in the apparatus for determining channel transmission behavior configured to perform the method for determining channel transmission behaviors. In the following embodiments of the present application, the apparatus for determining channel transmission behavior provided in the embodiments of the present application is described by taking an example in which the method for determining channel transmission behavior is performed by the apparatus for determining channel transmission behavior.

Figure 5:
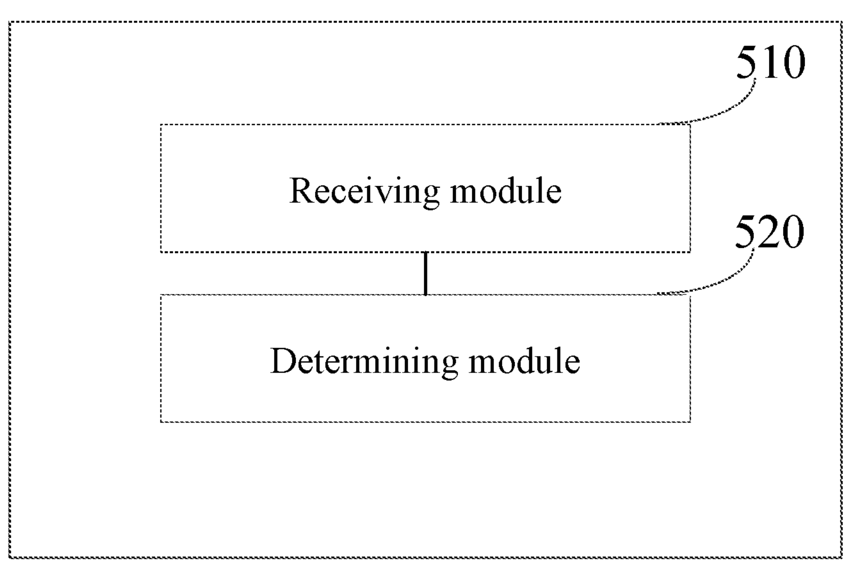
FIG. 5 is a schematic structural block diagram of an apparatus for determining channel transmission behavior provided by an exemplary embodiment of the present application.

FIG. 5 shows an apparatus for determining channel transmission behavior 500 provided by an exemplary embodiment of the present application, the apparatus 500 includes: a receiving module 510, configured to receive a physical downlink control channel PDCCH; and a determining module 520, configured to determine that the PDCCH is non-repetition transmission or repetition transmission.

In a possible implementation, the determining module 510 is configured to determine that the PDCCH is non-repetition transmission or repetition transmission according to a scrambling mode of the PDCCH.

In another possible implementation, the determining module is configured to: in a case that the scrambling mode is any of the following, determine that the PDCCH is repetition transmission: scrambling at least one of cyclic redundancy check CRC bits by using a first identifier, where the first identifier is a unique identifier for scrambling a channel for repetition transmission; scrambling at least one bit in a first bit group by using the second identifier, the first bit group is other bits in the CRC bits except a second bit group, the second bit group are bits used by the terminal to determine different downlink control information DCI formats, the second identifier is a unique identifier used to scramble the channel for repetition transmission, and the number of bits in the second identifier is not greater than the number of bits in the first bit group; and scrambling a third bit group by using a third identifier, where the third bit group is obtained by shifting the second bit group.

In another possible implementation, the first identifier is obtained through any of the following methods: high-layer signaling configuration; and determined based on a fourth identifier.

In another possible implementation, the first identifier and/or the second identifier is associated with a first search space SS used for repetition transmission.

In another possible implementation, the second identifier is obtained through any of the following methods: high-layer signaling configuration; and protocol agreement.

In another possible implementation, the first identifier and/or the third identifier both include a radio network temporary identifier RNTI.

In another possible implementation, the determining module 510 is configured to determine that the PDCCH is non-repetition transmission or repetition transmission according to predetermined information carried in the PDCCH; where the predetermined information is used to indicate that the PDCCH belongs to repetition transmission or non-repetition transmission.

In another possible implementation, the apparatus is configured to: default that the PDCCH is a designated channel transmission behavior, where the designated channel transmission behavior is repetition transmission or non-repetition transmission.

In another possible implementation, the determining module 510 is configured to determine that the PDCCH is non-repetition transmission or repetition transmission according to a specified identifier on a monitoring occasion corresponding to the PDCCH 27, where the specified identifier includes an SS identifier or a control resource set identifier.

In another possible implementation, the determining module 510 determining that the PDCCH is non-repetition transmission or repetition transmission according to a designated identifier on a monitoring occasion includes: determining that the PDCCH is non-repetition transmission or repetition transmission according to the largest or smallest identifier of designated identifiers.

In another possible implementation, the determining module 510 is configured to: in a case that the PDCCH is successfully received based on a first aggregation level, determine that the PDCCH is repetition transmission; and in a case that the PDCCH is successfully received based on a second aggregation level, determine that the PDCCH is non-repetition transmission; where the first aggregation level and the second aggregation level are different.

In another possible implementation, in a case that a first aggregation level group and a second aggregation level group are preconfigured, and the first aggregation level group and the second aggregation level group respectively include one or more aggregation levels, the first aggregation level is the largest aggregation level in the first aggregation level group, and the second aggregation level is the smallest aggregation level in the second aggregation level group; or the first aggregation level is the smallest aggregation level in the first aggregation level group, and the second aggregation level is the largest aggregation level in the second aggregation level group.

In another possible implementation, in a case that the first aggregation level is 16, the second aggregation level cannot be 8, or in a case that the second aggregation level is 16; the first aggregation level cannot be 8.

In another possible implementation, in a case that a first condition is satisfied, the first aggregation level is 16, and the second aggregation level cannot be 8, or the first aggregation level is 8, and the second aggregation level cannot be 16; and the first condition includes: start indexes of control channel elements of the two PDCCH candidates are the same, associated control resource sets are configured with one OFDM symbol, the control resource sets are in non-interleaving mode; one of the two PDCCH candidates is used for receiving the PDCCH of non-repetition transmission, and the other is used for receiving the PDCCH of repetition transmission.

In another possible implementation, the determining module is further configured to: in a case that the PDCCH is successfully received based on a third aggregation level and the first condition is satisfied, determining that the PDCCH is repetition transmission or non-repetition transmission according to a search space associated with the fourth aggregation level; where the third aggregation level is 8, and the fourth aggregation level is 16; and the first condition includes: start indexes of control channel elements of the two PDCCH candidates are the same, associated control resource sets are configured with one OFDM symbol, the control resource sets are in non-interleaving mode; one of the two PDCCH candidates is used for receiving the PDCCH of non-repetition transmission, and the other is used for receiving the PDCCH of repetition transmission.

In another possible implementation, the repetition transmission has the same time-frequency resource, or the repetition transmission has different time-frequency resources.

In another possible implementation, the determining module is further configured to: in a case that the PDCCH is repetition transmission, determine that an SS to which the PDCCH belongs is a first SS; and in a case that the PDCCH is non-repetition transmission, determine that an SS to which the PDCCH belongs is a second SS; where the first SS is used for repetition transmission, and the second SS is used for non-repetition transmission.

In this embodiment, it is determined whether the PDCCH is non-repetition transmission or repetition transmission during the receiving process of the PDCCH, where the channel transmission behavior includes non-repetition transmission and/or repetition transmission. Thus, on the one hand, the terminal can clearly know the channel transmission behavior of the received PDCCH, and then clearly determine how to execute the subsequent behavior, such as whether to execute Rel16 or Rel17, ensuring communication quality. On the other hand, on the basis of the technical solution given in this application, it can also ensure that the base station can dynamically send a PDCCH on a single TRP and multiple TRPs, ensuring the flexibility of base station configuration.

The apparatus for determining channel transmission behavior 500 in the embodiment of the present application may be a device, or may be a component, an integrated circuit, or a chip in a terminal. The apparatus may be a mobile terminal, or a non-mobile terminal. For example, the mobile terminal may include but is not limited to the foregoing listed types of terminals 11. The non-mobile terminal may be a server, a Network Attached Storage (NAS), a personal computer (PC), a television (TV), a teller machine, or a self-service machine. This is not specifically limited in this embodiment of this application.

The apparatus for determining channel transmission behavior 500 in this embodiment of the present application may be an apparatus with an operating system. The operating system may be an Android operating system, an iOS operating system, or another possible operating system, which is not specifically limited in the embodiments of this application.

Figure 4:
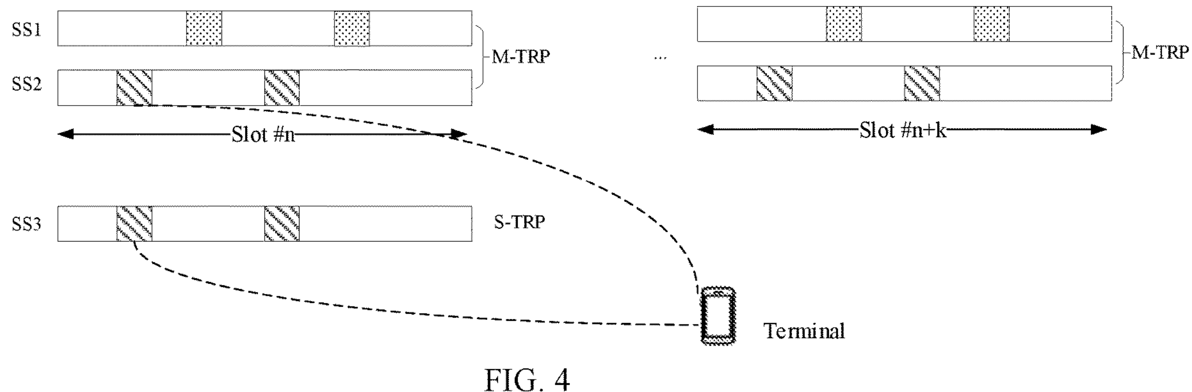
FIG. 4 is a schematic diagram of a channel transmission process provided by an exemplary embodiment of the present application.

The apparatus for determining channel transmission behavior 500 provided by the embodiment of the present application can realize each process realized by the method embodiments in FIG. 2 to FIG. 4, and achieve the same technical effect. To avoid repetition, details are not repeated here.

Figure 6:
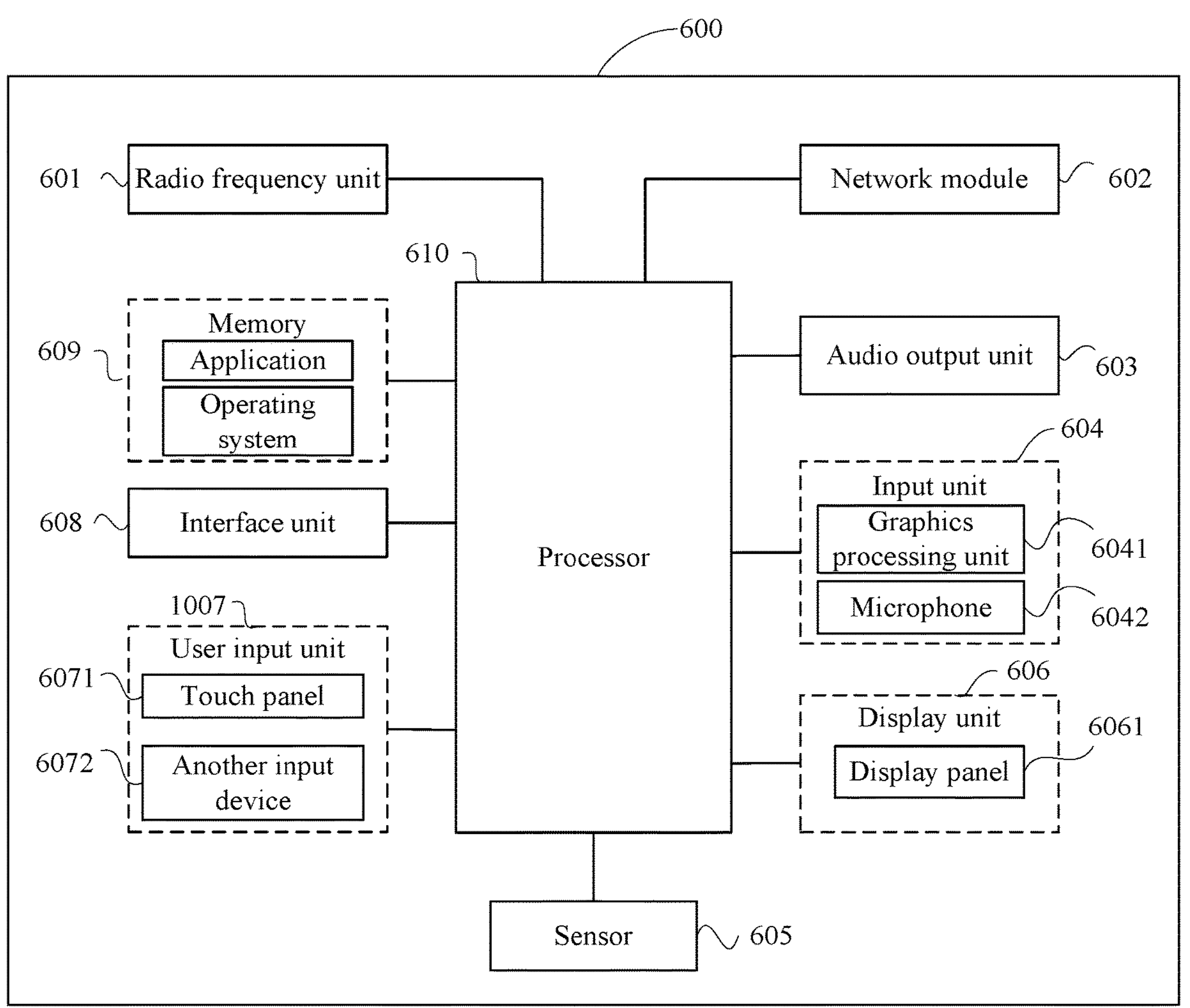
FIG. 6 is a schematic structural block diagram of a terminal provided by an exemplary embodiment of this application.

FIG. 6 is a schematic diagram of a hardware structure of a terminal according to an embodiment of this application.

A terminal 600 includes but is not limited to components such as a radio frequency unit 601, a network module 602, an audio output unit 603, an input unit 604, a sensor 605, a display unit 606, a user input unit 607, an interface unit 608, a memory 609, and a processor 610.

A person skilled in the art can understand that the terminal 600 may further include a power supply (such as a battery) that supplies power to each component. The power supply may be logically connected to the processor 610 by using a power supply management system, to implement functions such as charging and discharging management, and power consumption management by using the power supply management system. The terminal structure shown in FIG. 6 constitutes no limitation on the terminal, and the terminal may include more or fewer components than those shown in the figure, or combine some components, or have different component arrangements. Details are not described herein.

It should be understood that, in the embodiments of this application, the input unit 604 may include a Graphics Processing Unit (GPU) 6041 and a microphone 6042, and the graphics processing unit 6041 processes image data of a still picture or video obtained by an image capture apparatus (such as a camera) in a video capture mode or an image capture mode. The display unit 606 may include a display panel 6061. The display panel 6061 may be configured in a form such as a liquid crystal display or an organic light-emitting diode. The user input unit 607 includes a touch panel 6071 and another input device 6072. The touch panel 6071 is also referred to as a touchscreen. The touch panel 6071 may include two parts: a touch detection apparatus and a touch controller. The another input device 6072 may include but is not limited to a physical keyboard, a functional button (such as a volume control button or a power on/off button), a trackball, a mouse, and a joystick. Details are not described herein.

In this embodiment of this application, the radio frequency unit 601 receives downlink data from a network side device and then sends the downlink data to the processor 610 for processing; and sends uplink data to the network side device. Usually, the radio frequency unit 601 includes but is not limited to an antenna, at least one amplifier, a transceiver, a coupler, a low noise amplifier, a duplexer, and the like.

The memory 609 may be configured to store a software program or an instruction and various data. The memory 609 may mainly include a program or instruction storage area and a data storage area, where the program or instruction storage area may store an operating system, an application program or instructions required by at least one function (such as a sound playback function, an image playback function, etc.) and the like. In addition, the memory 609 may include a high-speed random access memory, and may further include a non-volatile memory. The non-volatile memory may be a Read-only Memory (ROM), a Programmable ROM (PROM), an Erasable PROM (EPROM), an Electrically EPROM (EEPROM), or a flash memory, for example, at least one disk storage device, a flash memory device, or another non-volatile solid-state storage device.

The processor 610 may include one or more processing units. In some embodiments, an application processor and a modem processor may be integrated into the processor 610. The application processor mainly processes an operating system, a user interface, an application, an instruction, or the like. The modem processor mainly processes wireless communications, for example, a baseband processor. It can be understood that, the modem processor may not be integrated into the processor 610.

The processor 610 is configured to receive a physical downlink control channel PDCCH; and determine that the PDCCH is non-repetition transmission or repetition transmission.

In another possible implementation, the processor 610 is configured to determine that the PDCCH is non-repetition transmission or repetition transmission according to a scrambling mode of the PDCCH.

In another possible implementation, the processor 610 is configured to: in a case that the scrambling mode is any of the following, determine that the PDCCH is repetition transmission: scrambling at least one of cyclic redundancy check CRC bits by using a first identifier, where the first identifier is a unique identifier for scrambling a channel for repetition transmission; scrambling at least one bit in a first bit group by using the second identifier, the first bit group is other bits in the CRC bits except a second bit group, the second bit group are bits used by the terminal to determine different downlink control information DCI formats, the second identifier is a unique identifier used to scramble the channel for repetition transmission, and the number of bits in the second identifier is not greater than the number of bits in the first bit group; and scrambling a third bit group by using a third identifier, where the third bit group is obtained by shifting the second bit group.

In another possible implementation, the first identifier is obtained through any of the following methods: high-layer signaling configuration; and determined based on a fourth identifier.

In another possible implementation, the first identifier and/or the second identifier is associated with the first SS used for repetition transmission.

In another possible implementation, the second identifier is obtained through any of the following methods: high-layer signaling configuration; and protocol agreement.

In another possible implementation, the first identifier and/or the third identifier both include a radio network temporary identifier RNTI.

In another possible implementation, the processor 610 is configured to determine that the PDCCH is non-repetition transmission or repetition transmission according to predetermined information carried in the PDCCH; where the predetermined information is used to indicate that the PDCCH belongs to repetition transmission or non-repetition transmission.

In another possible implementation, the processor 610 is configured to default that the PDCCH is a designated channel transmission behavior, where the designated channel transmission behavior is repetition transmission or non-repetition transmission.

In another possible implementation, the processor 610 is configured to determine that the PDCCH is non-repetition transmission or repetition transmission according to a specified identifier on a monitoring occasion corresponding to the PDCCH, where the specified identifier includes an SS identifier or a control resource set identifier.

In another possible implementation, the processor 610 being configured to determining that the PDCCH is non-repetition transmission or repetition transmission according to a designated identifier on a monitoring occasion includes: determining that the PDCCH is non-repetition transmission or repetition transmission according to the largest or smallest identifier of designated identifiers.

In another possible implementation, the processor 610 is configured to: in a case that the PDCCH is successfully received based on a first aggregation level, determine that the PDCCH is repetition transmission; and in a case that the PDCCH is successfully received based on a second aggregation level, determine that the PDCCH is non-repetition transmission; where the first aggregation level and the second aggregation level are different.

In another possible implementation, in a case that a first aggregation level group and a second aggregation level group are preconfigured, and the first aggregation level group and the second aggregation level group respectively include one or more aggregation levels, the first aggregation level is the largest aggregation level in the first aggregation level group, and the second aggregation level is the smallest aggregation level in the second aggregation level group; or the first aggregation level is the smallest aggregation level in the first aggregation level group, and the second aggregation level is the largest aggregation level in the second aggregation level group.

In another possible implementation, in a case that the first aggregation level is 16, the second aggregation level cannot be 8, or in a case that the second aggregation level is 16; the first aggregation level cannot be 8.

In another possible implementation, in a case that a first condition is satisfied, the first aggregation level is 16, and the second aggregation level cannot be 8, or the first aggregation level is 8, and the second aggregation level cannot be 16; and the first condition includes: start indexes of control channel elements of the two PDCCH candidates are the same, associated control resource sets are configured with one OFDM symbol, the control resource sets are in non-interleaving mode; one of the two PDCCH candidates is used for receiving the PDCCH of non-repetition transmission, and the other is used for receiving the PDCCH of repetition transmission.

In another possible implementation, the processor 610 is further configured to: in a case that the PDCCH is successfully received based on a third aggregation level and the first condition is satisfied, determining that the PDCCH is repetition transmission or non-repetition transmission according to a search space associated with the fourth aggregation level; where the third aggregation level is 8, and the fourth aggregation level is 16; and the first condition includes: start indexes of control channel elements of the two PDCCH candidates are the same, associated control resource sets are configured with one OFDM symbol, the control resource sets are in non-interleaving mode; one of the two PDCCH candidates is used for receiving the PDCCH of non-repetition transmission, and the other is used for receiving the PDCCH of repetition transmission.

In another possible implementation, the repetition transmission has the same time-frequency resource, or the repetition transmission has different time-frequency resources.

In another possible implementation, the processor 610 is further configured to: in a case that the PDCCH is repetition transmission, determine that an SS to which the PDCCH belongs is a first SS; and in a case that the PDCCH is non-repetition transmission, determine that an SS to which the PDCCH belongs is a second SS; where the first SS is used for repetition transmission, and the second SS is used for non-repetition transmission.

In this embodiment, the channel transmission behavior corresponding to the PDCCH is determined during the receiving process of the PDCCH, where the channel transmission behavior includes non-repetition transmission and/or repetition transmission. Thus, on the one hand, the terminal can clearly know the channel transmission behavior of the received PDCCH, and then clearly determine how to execute the subsequent behavior, such as whether to execute Rel16 or Rel17, ensuring communication quality. On the other hand, on the basis of the technical solution given in this application, it can also ensure that the base station can dynamically send a PDCCH on a single TRP and multiple TRPs, ensuring the flexibility of base station configuration.

An embodiment of the present application further provides a readable storage medium. The readable storage medium stores a program or an instruction, and when the program or the instruction is executed by a processor, the various processes of the foregoing method for determining channel transmission behavior embodiment is performed and the same technical effects can be achieved. To avoid repetition, details are not described herein again.

The processor is a processor in the terminal in the foregoing embodiment. The readable storage medium includes a computer-readable storage medium such as a Read-Only Memory (ROM), a Random Access Memory (RAM), a magnetic disk, an optical disc, or the like.

An embodiment of the present application further provides a chip, the chip includes a processor and a communication interface, the communication interface is coupled to the processor, and the processor is configured to run the program or instruction of the network side device to realize each process of the embodiment of the method for determining channel transmission behavior, and can achieve the same technical effect. To avoid repetition, details are not repeated herein.

It should be understood that, the chip mentioned in this embodiment of this application may also be referred to as a system-level chip, a system chip, a chip system, or an on-chip system chip.

The embodiments of the present application further provide a computer program product, the computer program product includes a processor, a memory, and a program or an instruction stored in the memory and executable on the processor, when the program or the instruction is executed by the processor, each process of the above-mentioned method for determining channel transmission behavior embodiment can be realized, and the same technical effect can be achieved. To avoid repetition, details are not repeated herein.

It should be noted that in this specification, the term "include", "comprise", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A method for determining channel transmission behavior, performed by a terminal, the method comprising:

receiving a physical downlink control channel (PDCCH); and determining that the PDCCH is non-repetition transmission or repetition transmission, wherein the determining that the PDCCH is non-repetition transmission or repetition transmission comprises:

defaulting that the PDCCH is a Downlink Control Information (DCI) format belonging to repetition transmission in response to determining that time-frequency resources of the PDCCH candidate for a single transmission and the PDCCH candidate for repetition transmission completely overlap, or determining that frequency domain resources of two PDCCH candidates partially overlap, start indexes of Control Channel Element (CCE) of the two PDCCH candidates are same, and control resource sets (CORESETs) associated with the two PDCCH candidates are all configured with one OFDM symbol and in non-interleaving mode.

2. The method according to claim 1, wherein the determining that the PDCCH is non-repetition transmission or repetition transmission further comprises:

determining that the PDCCH is non-repetition transmission or repetition transmission according to predetermined information carried in the PDCCH, wherein the predetermined information is used to indicate that the PDCCH belongs to repetition transmission or non-repetition transmission.

3. The method according to claim 1, wherein the determining that the PDCCH is non-repetition transmission or repetition transmission further comprises:

determining that the PDCCH is non-repetition transmission or repetition transmission according to a specified identifier on a monitoring occasion corresponding to the PDCCH, wherein the specified identifier comprises an SS identifier or a control resource set identifier.

4. The method according to claim 3, wherein the determining that the PDCCH is non-repetition transmission or repetition transmission according to the specified identifier on the monitoring occasion corresponding to the PDCCH comprises:

determining that the PDCCH is non-repetition transmission or repetition transmission according to the largest or smallest identifier of designated identifiers.

5. The method according to claim 1, wherein the determining that the PDCCH is non-repetition transmission or repetition transmission further comprises:

when the PDCCH is successfully received based on a first aggregation level, determining that the PDCCH is repetition transmission; and when the PDCCH is successfully received based on a second aggregation level, determining that the PDCCH is non-repetition transmission, wherein the first aggregation level and the second aggregation level are different.

6. The method according to claim 5, wherein when a first aggregation level group and a second aggregation level group are preconfigured, and the first aggregation level group and the second aggregation level group respectively comprise one or more aggregation levels, the first aggregation level is the largest aggregation level in the first aggregation level group, and the second aggregation level is the smallest aggregation level in the second aggregation level group; or the first aggregation level is the smallest aggregation level in the first aggregation level group, and the second aggregation level is the largest aggregation level in the second aggregation level group.

7. The method according to claim 5, wherein when the first aggregation level is 16, the second aggregation level cannot be 8; or when the second aggregation level is 16, the first aggregation level cannot be 8.

8. The method according to claim 7, wherein when a first condition is satisfied, the first aggregation level is 16, and the second aggregation level cannot be 8, or the first aggregation level is 8, and the second aggregation level cannot be 16; and the first condition comprises: start indexes of control channel elements of the two PDCCH candidates are the same, associated control resource sets are configured with one OFDM symbol, the control resource sets are in non-interleaving mode; one of the two PDCCH candidates is used for receiving the PDCCH of non-repetition transmission, and the other is used for receiving the PDCCH of repetition transmission.

9. The method according to claim 1, wherein the determining that the PDCCH is non-repetition transmission or repetition transmission further comprises:

when the PDCCH is successfully received based on a third aggregation level and the first condition is satisfied, determining that the PDCCH is repetition transmission or non-repetition transmission according to a search space associated with the fourth aggregation level, wherein the third aggregation level is 8, and the fourth aggregation level is 16; and the first condition comprises: start indexes of control channel elements of the two PDCCH candidates are the same, associated control resource sets are configured with one OFDM symbol, the control resource sets are in non-interleaving mode; one of the two PDCCH candidates is used for receiving the PDCCH of non-repetition transmission, and the other is used for receiving the PDCCH of repetition transmission.

10. The method according to claim 1, wherein after determining that the PDCCH is non-repetition transmission or repetition transmission, the method further comprises:

when the PDCCH is repetition transmission, determining that an SS to which the PDCCH belongs is a first SS; and when the PDCCH is non-repetition transmission, determining that an SS to which the PDCCH belongs is a second SS, wherein the first SS is used for repetition transmission, and the second SS is used for non-repetition transmission.

11. A terminal, comprising:

a memory storing a computer program; and a processor coupled to the memory and configured to execute the computer program, wherein the computer program, when executed by the processor, causes the processor to perform operations comprising:

receiving a physical downlink control channel (PDCCH); and determining that the PDCCH is non-repetition transmission or repetition transmission, wherein the determining that the PDCCH is non-repetition transmission or repetition transmission comprises:

defaulting that the PDCCH is a Downlink Control Information (DCI) format belonging to repetition transmission in response to determining that time-frequency resources of the PDCCH candidate for a single transmission and the PDCCH candidate for repetition transmission completely overlap, or determining that frequency domain resources of two PDCCH candidates partially overlap, start indexes of Control Channel Element (CCE) of the two PDCCH candidates are same, and control resource sets (CORESETs) associated with the two PDCCH candidates are all configured with one OFDM symbol and in non-interleaving mode.

12. The terminal according to claim 11, wherein the determining that the PDCCH is non-repetition transmission or repetition transmission further comprises:

determining that the PDCCH is non-repetition transmission or repetition transmission according to a specified identifier on a monitoring occasion corresponding to the PDCCH, wherein the specified identifier comprises an SS identifier or a control resource set identifier.

13. The terminal according to claim 12, wherein the determining that the PDCCH is non-repetition transmission or repetition transmission according to the specified identifier on the monitoring occasion corresponding to the PDCCH comprises:

determining that the PDCCH is non-repetition transmission or repetition transmission according to the largest or smallest identifier of designated identifiers.

14. The terminal according to claim 11, wherein the determining that the PDCCH is non-repetition transmission or repetition transmission further comprises:

when the PDCCH is successfully received based on a first aggregation level, determining that the PDCCH is repetition transmission; and when the PDCCH is successfully received based on a second aggregation level, determining that the PDCCH is non-repetition transmission, wherein the first aggregation level and the second aggregation level are different.

15. The terminal according to claim 14, wherein when a first aggregation level group and a second aggregation level group are preconfigured, and the first aggregation level group and the second aggregation level group respectively comprise one or more aggregation levels, the first aggregation level is the largest aggregation level in the first aggregation level group, and the second aggregation level is the smallest aggregation level in the second aggregation level group; or the first aggregation level is the smallest aggregation level in the first aggregation level group, and the second aggregation level is the largest aggregation level in the second aggregation level group.

16. The terminal according to claim 14, wherein when the first aggregation level is 16, the second aggregation level cannot be 8; or when the second aggregation level is 16, the first aggregation level cannot be 8.

17. The terminal according to claim 16, wherein when a first condition is satisfied, the first aggregation level is 16, and the second aggregation level cannot be 8, or the first aggregation level is 8, and the second aggregation level cannot be 16; and the first condition comprises: start indexes of control channel elements of the two PDCCH candidates are the same, associated control resource sets are configured with one OFDM symbol, the control resource sets are in non-interleaving mode; one of the two PDCCH candidates is used for receiving the PDCCH of non-repetition transmission, and the other is used for receiving the PDCCH of repetition transmission.

18. The terminal according to claim 11, wherein the determining that the PDCCH is non-repetition transmission or repetition transmission further comprises:

when the PDCCH is successfully received based on a third aggregation level and the first condition is satisfied, determining that the PDCCH is repetition transmission or non-repetition transmission according to a search space associated with the fourth aggregation level, wherein the third aggregation level is 8, and the fourth aggregation level is 16; and the first condition comprises: start indexes of control channel elements of the two PDCCH candidates are the same, associated control resource sets are configured with one OFDM symbol, the control resource sets are in non-interleaving mode; one of the two PDCCH candidates is used for receiving the PDCCH of non-repetition transmission, and the other is used for receiving the PDCCH of repetition transmission.

19. The terminal according to claim 11, wherein after determining that the PDCCH is non-repetition transmission or repetition transmission, the method further comprises:

when the PDCCH is repetition transmission, determining that an SS to which the PDCCH belongs is a first SS; and when the PDCCH is non-repetition transmission, determining that an SS to which the PDCCH belongs is a second SS, wherein the first SS is used for repetition transmission, and the second SS is used for non-repetition transmission.

20. A non-transitory computer-readable storage medium, storing a computer program, when the computer program is executed by a processor, causes the processor to perform operations comprising:

receiving a physical downlink control channel (PDCCH); and determining that the PDCCH is non-repetition transmission or repetition transmission, wherein the determining that the PDCCH is non-repetition transmission or repetition transmission comprises:

defaulting that the PDCCH is a Downlink Control Information (DCI) format belonging to repetition transmission in response to determining that time-frequency resources of the PDCCH candidate for a single transmission and the PDCCH candidate for repetition transmission completely overlap, or determining that frequency domain resources of two PDCCH candidates partially overlap, start indexes of Control Channel Element (CCE) of the two PDCCH candidates are same, and control resource sets (CORESETs) associated with the two PDCCH candidates are all configured with one OFDM symbol and in non-interleaving mode.

* * * * *